United States Patent
Emmer

[15] 3,667,645
[45] June 6, 1972

[54] COVER AND KNOB ASSEMBLY FOR A COFFEE PERCOLATOR

[72] Inventor: Milton Emmer, 2171 Bragg St., Brooklyn, N.Y. 11229

[22] Filed: June 17, 1970

[21] Appl. No.: 46,896

[52] U.S. Cl. ................................................ 220/82.5, 99/313
[51] Int. Cl. ............................................................. A47j 31/04
[58] Field of Search ..................... 220/82, 82.5; 99/310, 311, 99/312, 313, 314; 85/8.8

[56] References Cited

UNITED STATES PATENTS

| | | | |
|---|---|---|---|
| 2,008,156 | 7/1935 | Rottum | 220/82.5 |
| 2,022,320 | 11/1935 | Moore | 220/82.5 |
| 1,750,257 | 3/1930 | Bonnell | 85/8.8 UX |
| 2,188,596 | 1/1940 | Hobert | 85/8.8 UX |

*Primary Examiner*—George E. Lowrance
*Attorney*—Victor M. Helfand

[57] ABSTRACT

A cover and knob assembly for a coffee percolator; the cover having an opening for the knob. The knob comprises a hollow body closed at one end and open at its other and has its closed end section projecting from and overlying the edges of the cover opening and its open end section extending through the cover opening. The open end section has oppositely laterally facing detent projections at its bottom. A U-shaped spring clip having arcuate sides with the altitude of the arcs greater than the distance between the projections and the underside of the cover, supported on the projections by the convex edges of the arcuate portions of its sides, with the ends of the sides resiliently pressing against the underside of the cover.

9 Claims, 5 Drawing Figures

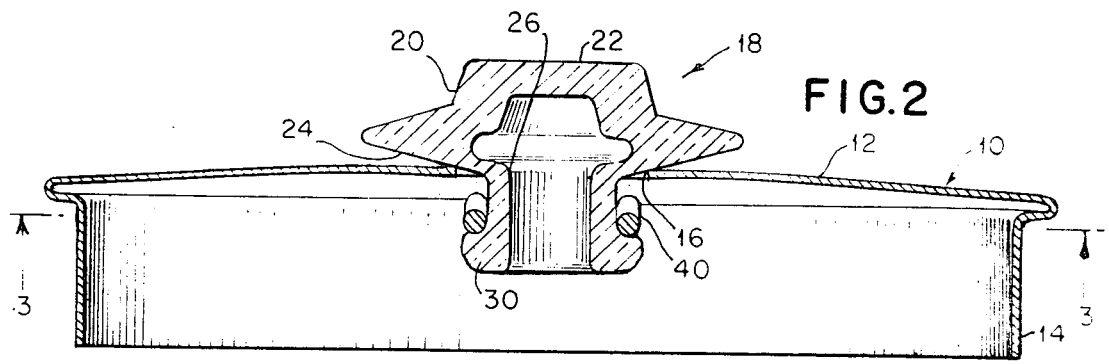
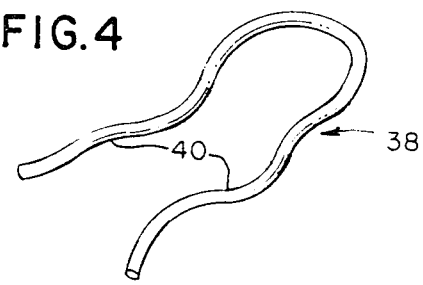
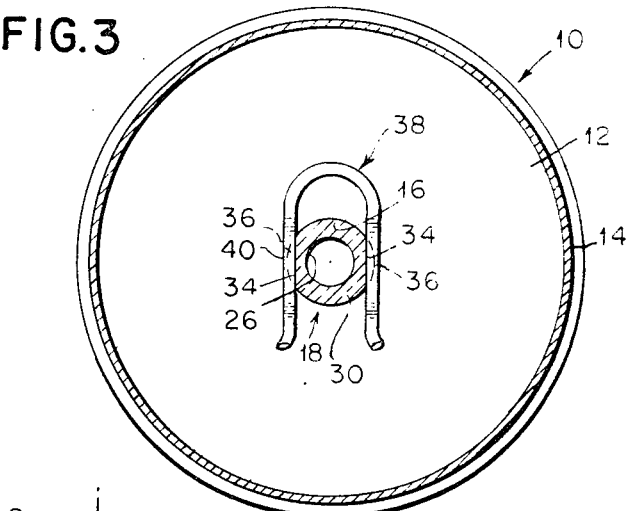
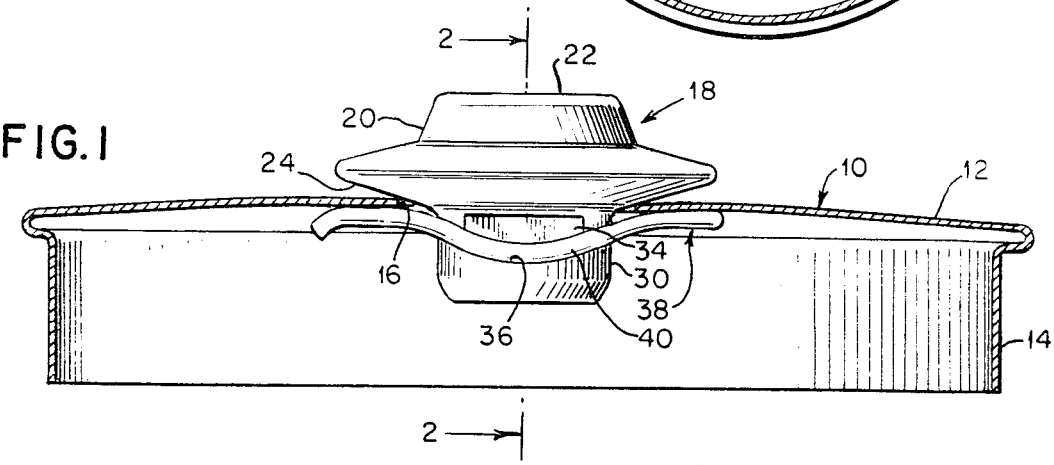
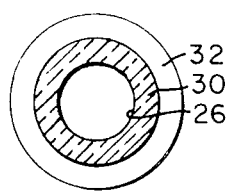

COVER AND KNOB ASSEMBLY FOR A COFFEE PERCOLATOR

The present invention relates to covers or lids for coffee percolators and more particularly, to the assembly of such cover with a transparent knob that serves both for handling the cover and as a means for making visual the activity within the perculator.

The covers for perculators of the type to which the present invention relates, are generally formed with a center opening in the top wall thereof, into which is inserted a hollow knob element. The knob has a hollow upper section which is formed with a bottom portion of greater diameter than the opening and overlies its edges, and with a hollow integral stem extension which projects through the opening to the cover interior; the upper section being at least partly transparent. For purposes of initial assembly, disassembly and re-assembly for cleaning purposes, such knob is releasable from the cover.

In cover and knob assemblies of the prior art, it has been found that the knob loosens within its receiving opening in the cover and the two become undesirably separated from one another, frequently resulting in the loss or misplacing of the knob, or in its breaking.

It is the object of the present invention, therefore, to provide a cover and knob assembly for a perculator in which the knob is safely and securely held on the cover against inadvertent separation therefrom.

It is also an object of the present invention to provide a knob and cover assembly which is of relatively simple construction and which is simple and easy to put together and simple and easy to dis-assemble.

It is another object of the present invention to provide a cover and knob assembly of the character described, which is economical to produce.

It is still another object of the present invention to provide a knob for assembly with a percolator cover of the character described which will fit snugly within knob-receiving opening in percolator cover of different sizes, so as not to shift laterally within such openings.

It is a further object of the present invention to provide a knob and associated means for retaining it on a cover, which may fit and may be suitable for use with and be retained on the various types of covers commonly used for coffee perculators that are available on the market.

The foregoing and other objects and advantages of the coffee percolator cover and knob assembly of the present invention will become more readily apparent to those skilled in the art from the embodiment thereof shown in the accompanying drawing and from the description following. It is to be understood, however, that such embodiment is shown for purposes of illustration only and without intent of limiting the invention to the specific details therein shown.

In the drawings:

FIG. 1 is a cross-sectional and partly elevational view of a cover and knob assembly for a coffee percolator, embodying the present invention;

FIG. 2 is a section taken on line 2—2 of FIG. 1;

FIG. 3 is a section taken on line 3—3 of FIG. 2;

FIG. 4 is a perspective view of one form of spring clip for use in the cover and knob assembly of the invention; and FIG. 5 is a section taken through the bottom section of a modified form of knob of the invention.

Generally stated, the present invention resides in the provision on the inwardly extending stem of the percolator cover knob an abutement for the center of an acruate, U-shaped, spring clip whose ends engage against the underside of the top wall of the percolator cover around the knob opening therein, to thereby resiliently retain the knob securely on the cover.

More specifically stated, and with reference to the embodiment of the invention illustrated in the drawing, the cover of the assembly, generally designated as 10, may be of conventional type, including the top well, 12, and the annular flange 14, depending from the top wall in inwardly offset relation to its edge; the top of wall 12 having the conventional, circular knob-receiving opening 16.

The kob, generally designated as 18, comprises a hollow top section which may be defined by a circular wall 20, and a top wall 22. At least the lower portion of the top section of knob 18 is enlarged to a diameter greater than the diameter of the opening 16 and is provided with a bottom, 24, which overlies the marginal edge portions of the opening 16. The bottom 24 of the upper section of knob 18 is formed with an opening, 26, from the edge of which depends a tubular stem 30 of a diameter to fit within opening 16 and of a length to project a substantial distance inwardly into the cover 10.

In order to have the knob 18 fit opening 16 of different diameters, bottom 24 may be formed to taper outwardly to conical shape, as illustrated.

The overlying bottom portion 24 may be provided by forming the bottom wall portion of the upper knob section to be of a generally larger diameter than the opening 16, as illustrated, or may be provided by a flange extending laterally from a cylindrical upper knob section; both forms being conventional in the art. Such flange may, likewise be conical in shape, tapering upwardly.

In order to retain knob 18 within opening 16 of cover 10, the cylindrical wall of stem section 30 is reduce in thickness in an upwardly extending direction from a point immediately above its free end, to thereby form a shoulder or abutment at or adjscent to the said end of the stem. Such reduction in thickness is on the xterior of the stem and, while it may be circular and extend all around the circumference thereof, as shown in FIG. 5, to provide a circular, peripheral shoulder, 32, it is preferably provided only on diametrically opposed portions of the stem by cutting its wall thickness, from the exterior, at such points, to form flattened faces, 34, and thus provide oppositely disposed shoulders, 36, as shown in FIGS. 1, 2 and 3. Such shoulder portions 36 may preferably be formed with concave uppers surfaces, for a purpose which will hereafter be made clear.

Shoulder 32 or shoulder portions 36 serve to support on their upper surface a resilient element that also resiliently engages against the underside of cover top 12. Such element may comprise a U-shaped spring clip, formed of spring wire, generally designates as 38, formed with centrally cirved or arcuate sides, 40, connected by a web, 42, which are spaced apart a distance not greater than the thickness of the reduced portion of stem 30. The altitude of the arcuate central portion of clip sides 40 is greater than the distance between the upper surface of the shoulder 32 or shoulder portions 36, as the case may be, so that when such clip is rested on such shoulder or shoulder portions with the concavity of its sides 40 upwardly facing, the ends of clip sides 40 will resiliently press against the underside of cover top 12 to thereby immobilize and retain plug 18 in place. It will be apparent that in the form of plug illustrated in FIG. 1, the convex edges of clip sides 40 will rest in the concave surfaces of shoulder portions 36, to be more safely held in place against lateral displacement.

To facilitate the sliding of the clip 38 in place, the ends of each clip side 40 may be curved oppositely to its center portion and the free ends of the clips may e outwardly flared, as illustrated.

It may here be stated that the body of the knob 18 may be formed of any conventional material, as entirely of glass or of a suitable transparent synthetic plastic material, or may be formed of an opaque material with a transparent inset into its top wall 22, as is likewise conventional.

This completes the description of the coffee percolator cover assembly of the present invention and the means for retaining the plug on the cover.

It will be apparent that the plug and plug retaining means for the cover assembly of the present invention are economical to produce and simple and easy to assemble with a cover as well as to disassemble. It will also be apparent that the assembly of plug with the cover, when effected, will permit the swiveling of the knob in place without its being disengaged and inadvertently displaced and dropped. It will also be apparent that the plug and its retaining means may be utilized with covers having different plug-receiving openings and that in all cases, the plug will be snugly and fixedly held in place regardless of the size of such openings.

It will be further apparent that numerous modifications and variations may be made in the plug and cover assembly of the present invention, by anyone skilled in the art, in accordance with the principles of the invention hereinabove set forth, and without the exercise of any inventive enginuity.

I claim:

1. A cover for a coffee percolator, or the like, said cover comprising a top wall having a central opening formed therethrough, and a hollow knob for said cover extending through said opening; said knob comprising an upper section projecting above said top wall, said upper section closed at its outer end and having at least a portion thereof transparent, said upper section having a lower portion of greater dimension than said central opening and having an inwardly downwardly tapering bottom wall defining a central opening communicating with the interior of said upper section; and a lower tubular section connected to said bottom wall, surrounding said opening in said bottom wall and extending through said central opening below said top wall, means securing said knob in position on said top wall, comprising a clip fitted over said projecting lower section below said top wall of said cover section and projecting laterally from opposed sides of said lower section, and means on said tubular extension retaining said clip in position on said extension with said projecting position thereof engaging against the marginal edge portions of said opening in said top wall of said cover.

2. The cover of claim 1, wherein said clip is resilient and U-shaped.

3. The cover of claim 2, wherein said clip retaining means comprise shoulder portions formed on the exterior of opposed sides of said lower section at its free end, said clip having arcuate portions at the center of each side thereof of an altitude greater than the distance between said shoulder and the underside of said cover.

4. The cover of claim 3, wherein the wall of the inner portion of said lower section below said cover is of lesser thickness than the end edge portion thereof to thereby form a peripheral ledge around the exterior of said extension on its outer end, said sides of said clip supported on said ledge.

5. The cover of claim 3, wherein said shoulder portions are formed with upwardly facing concave surfaces for nesting the concave portions of said arcuate portions of the side of said clip.

6. The cover of claim 3, wherein said opening in said cover is circular and said upper section is of circular cross section and its inner portion is of greater diameter than said opening, and said bottom extends inwardly from the edge of said cylindrical portion, and said lower tubular section depends from the edges of the opening defined by said bottom.

7. A knob for the cover of a coffee percolator, having a top wall formed with a central opening for receiving said knob, said knob comprising a hollow tubular body having an upper section adapted to project above said cover, said upper section being closed at its top and having an inner portion of a diameter greater than said opening and having a downwardly and inwardly tapering bottom wall adapted to be seated in and engage the edges of said opening in said cover, said bottom wall defining a central opening communicating with the interior of upper section, and a lower tubular section adopted to extend through said opening depending from said bottom and surrounding said opening defined by said bottom, said lower section having means at its free end for supporting a resilient retaining clip fitted around said lower section below said bottom wall and having projecting end portions engageable against said bottom wall.

8. The knob of claim 7, wherein said means for supporting said clip comprise inner portions of said lower section having walls of reduced thickness to thereby form shoulders at its free end supporting said clip.

9. The knob of claim 7, wherein said upper portion is of circular cross section and said bottom extends inwardly and downwardly from the edge thereof, forming a conical portion adopted to be seated in cover openings of different sizes and engage against the edges of said openings.

* * * * *